United States Patent
Kobayashi et al.

(10) Patent No.: US 9,058,740 B2
(45) Date of Patent: Jun. 16, 2015

(54) STATE DETERMINING DEVICE, IMAGE PROCESSING APPARATUS, STATE DETERMINING METHOD, AND COMPUTER PROGRAM PRODUCT

(71) Applicants: Kazuhiro Kobayashi, Kanagawa (JP); Takashi Kuwayama, Kanagawa (JP); Yuki Sato, Ohta-ku (JP); Tetsuji Nishikawa, Tokyo (JP); Nobuhiro Shima, Kanagawa (JP); Jo Ebara, Kanagawa (JP)

(72) Inventors: Kazuhiro Kobayashi, Kanagawa (JP); Takashi Kuwayama, Kanagawa (JP); Yuki Sato, Ohta-ku (JP); Tetsuji Nishikawa, Tokyo (JP); Nobuhiro Shima, Kanagawa (JP); Jo Ebara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 73 days.

(21) Appl. No.: 13/895,828

(22) Filed: May 16, 2013

(65) Prior Publication Data
US 2013/0308151 A1    Nov. 21, 2013

(30) Foreign Application Priority Data

May 17, 2012    (JP) ................................ 2012-113718
Apr. 1, 2013    (JP) ................................ 2013-076308

(51) Int. Cl.
| | | |
|---|---|---|
| G06K 15/00 | (2006.01) | |
| G08B 21/18 | (2006.01) | |
| H04N 1/23 | (2006.01) | |
| H04N 1/00 | (2006.01) | |
| G03G 15/16 | (2006.01) | |
| G03G 15/00 | (2006.01) | |
| G06F 3/12 | (2006.01) | |

(52) U.S. Cl.
CPC ............ *G08B 21/182* (2013.01); *H04N 1/2346* (2013.01); *H04N 1/00018* (2013.01); *H04N 1/00037* (2013.01); *H04N 1/0005* (2013.01); *H04N 1/00063* (2013.01); *H04N 1/00076* (2013.01); *G03G 15/1615* (2013.01); *G03G 15/5079* (2013.01); *G03G 15/55* (2013.01); *G03G 15/757* (2013.01)

(58) Field of Classification Search
CPC ............ H04N 1/2346; H04N 1/00076; H04N 1/00018; G03G 15/5079
See application file for complete search history.

(56) References Cited

U.S. PATENT DOCUMENTS

| | | |
|---|---|---|
| 5,502,552 A | 3/1996 | Iwata et al. |
| 2006/0261544 A1 | 11/2006 | Tamura et al. |
| 2007/0051219 A1 | 3/2007 | Tamura et al. |

(Continued)

FOREIGN PATENT DOCUMENTS

JP    2011-197258    10/2011

*Primary Examiner* — Dov Popovici
(74) *Attorney, Agent, or Firm* — Oblon, McClelland, Maier & Neustadt, L.L.P.

(57) ABSTRACT

A state determining device includes a current detecting unit, a state determining unit, and a notifying unit. The current detecting unit detects a current value of a drive current which flows into a drive motor that rotary-drives a driven unit with a drive force according to the drive current. Based on the drive current value detected by the current detecting unit, the state determining unit determines a state of a driving system including the driven unit. The notifying unit notifies a user of a determination result of the state determining unit.

8 Claims, 6 Drawing Sheets

(56) References Cited

U.S. PATENT DOCUMENTS

| | | |
|---|---|---|
| 2007/0147925 A1 | 6/2007 | Nomura et al. |
| 2007/0160383 A1 | 7/2007 | Matsumoto et al. |
| 2008/0069635 A1 | 3/2008 | Maehata et al. |
| 2008/0089713 A1 | 4/2008 | Ishida et al. |
| 2008/0124152 A1 | 5/2008 | Nishikawa et al. |
| 2008/0260420 A1 | 10/2008 | Maehata et al. |
| 2009/0206547 A1 | 8/2009 | Tokita et al. |
| 2009/0317109 A1 | 12/2009 | Ehara et al. |
| 2009/0324258 A1 | 12/2009 | Satoh |
| 2010/0183322 A1 | 7/2010 | Funamoto et al. |
| 2010/0226676 A1 | 9/2010 | Funamoto et al. |
| 2010/0239318 A1 | 9/2010 | Maehata et al. |
| 2010/0303504 A1 | 12/2010 | Funamoto et al. |
| 2010/0319984 A1 | 12/2010 | Kuwayama |
| 2011/0026955 A1* | 2/2011 | Takahashi et al. ............ 399/48 |
| 2011/0044724 A1 | 2/2011 | Funamoto et al. |
| 2011/0058827 A1 | 3/2011 | Maehata et al. |
| 2011/0058870 A1 | 3/2011 | Murakami et al. |
| 2011/0222920 A1 | 9/2011 | Kobayashi et al. |
| 2011/0229158 A1 | 9/2011 | Yabuki et al. |
| 2012/0027464 A1 | 2/2012 | Kobayashi et al. |
| 2013/0058676 A1 | 3/2013 | Sato |
| 2013/0064567 A1 | 3/2013 | Akama et al. |
| 2013/0118303 A1 | 5/2013 | Murakami et al. |

* cited by examiner

STATE DETERMINING DEVICE, IMAGE PROCESSING APPARATUS, STATE DETERMINING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-113718 filed in Japan on May 17, 2012 and Japanese Patent Application No. 2013-076308 filed in Japan on Apr. 1, 2013.

BACKGROUND OF THE INVENTION

1. Field of the Invention

The present invention relates to a state determining device, an image processing apparatus, a state determining method, and a computer program product.

2. Description of the Related Art

Typically, in an image processing apparatus such as a facsimile device, a printer device, a copying device, a scanner device, or a multifunction peripheral; product development is done while taking into account the recycling of various components.

Particularly, in an image processing apparatus, drive motors are used to run movable components for the purpose of image reading or image formation. The drive motors are subject to drive control in such a way that the deterioration of the movable components does not lead to any variation in the running state. For example, in an image processing apparatus, if the deterioration of the movable components results in an increase in the processing load, the drive currents that flow into the drive motors are adjusted according to the processing load so as to ensure that the movable components run at the same speed.

Moreover, in the past, an image forming apparatus has been disclosed in which the state of the image forming apparatus, particularly the intensity of the processing load, is determined based on the current waveform during the driving period of a motor that drives components (see Japanese Patent Application Laid-open No. 2011-197258).

However, in the conventional technology, since the intensity of the processing load is determined based on the current waveform during the driving period of the motor, it becomes necessary to install a sophisticated and expensive circuit configuration for the purpose of detecting the changes in the current waveform. Hence, improvement is necessary in order to accurately and inexpensively detect the changes in the processing load.

Therefore, there is a need for a state determining device capable of accurately and inexpensively determining the state of a driving system of driven components that are driven by drive motors.

SUMMARY OF THE INVENTION

According to an embodiment, there is provided a state determining device that includes a current detecting unit, a state determining unit, and a notifying unit. The current detecting unit detects a current value of a drive current which flows into a drive motor that rotary-drives a driven unit with a drive force according to the drive current. Based on the drive current value detected by the current detecting unit, the state determining unit determines a state of a driving system including the driven unit. The notifying unit notifies a user of a determination result of the state determining unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A preferred embodiment of the present invention is described in detail below with reference to the accompanying drawings. Since the embodiment described below is the preferred embodiment of the present invention, various technically desirable limitations are applied. However, the scope of the invention is not unreasonably limited by the following explanation. Moreover, the constituent elements explained in the embodiment are not all essential constituent elements of the present invention.

Figure 1:
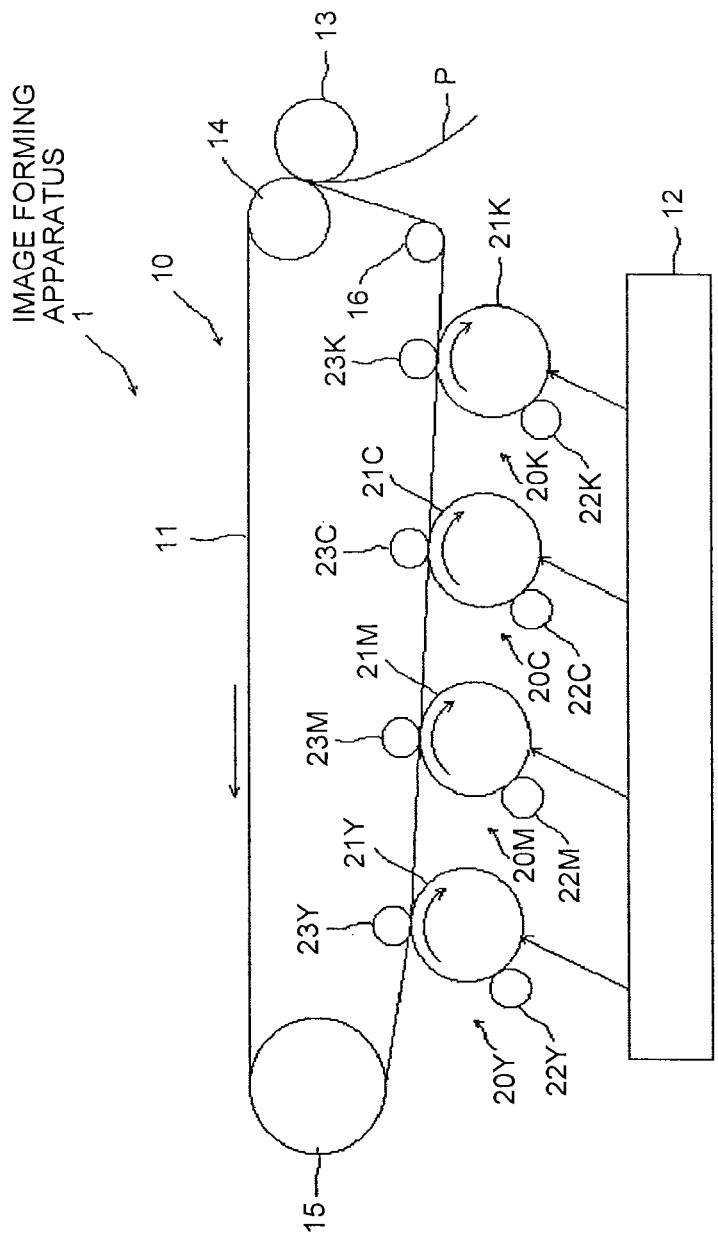
FIG. 1 is a skeleton framework of the main portion of an image forming apparatus in which an embodiment of the present invention is implemented.

FIG. 1 to FIG. 8 are diagrams illustrating an embodiment of a state determining device, an image processing apparatus, a state determining method, and a computer program product. FIG. 1 is a skeleton framework of the main portion of an image forming apparatus 1 in which are implemented the state determining device, the image processing apparatus, the state determining method, and the computer program product according to the embodiment of the present invention.

Figure 2:
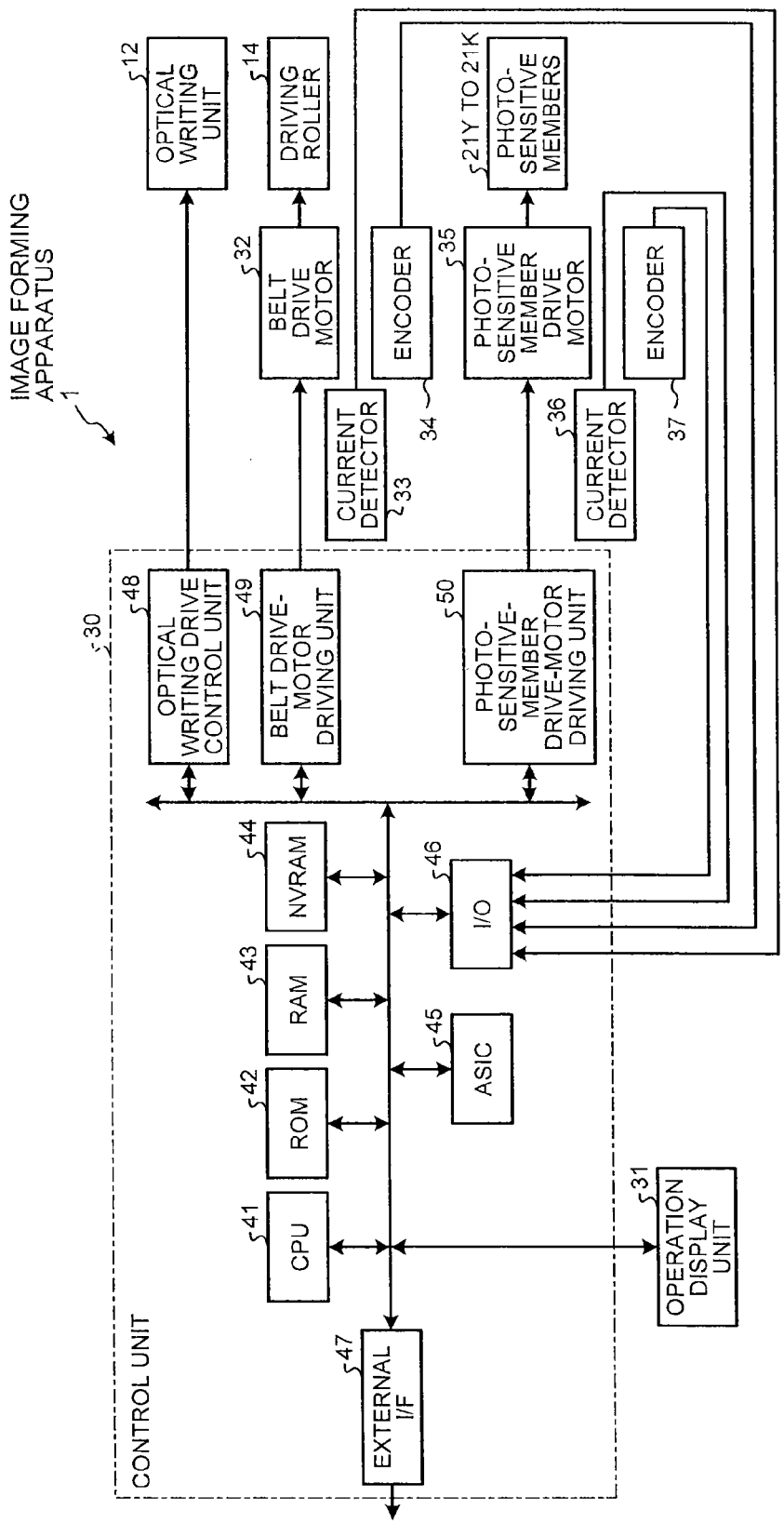
FIG. 2 is a block diagram of the main portion of the image forming apparatus.

In FIG. 1, the image forming apparatus 1 is a color image forming apparatus, and includes an image forming unit 10, a paper feeding unit (not illustrated), a control unit 30 (illustrated in FIG. 2), and an operation display unit 31 (illustrated in FIG. 2).

The paper feeding unit includes a paper cassette for storing a plurality of paper sheets P in the form of cut sheets or includes a roll paper storing unit for storing the paper sheets P in the form of a roll paper, and includes a carrying mechanism for carrying the paper sheets P to the image forming unit 10. With such a configuration, the paper sheets P are carried to the image forming unit 10.

The operation display unit 31 includes various operation keys as well as includes a display such as a liquid crystal display (LCD). Herein, various operations that need to be performed to operate the image forming apparatus 1 are performed using the operation keys. The operation display unit 31 functions as a notifying unit that notifies the user about a variety of information, which is to be notified from the image forming apparatus 1, in the form of a display output or an audio output. Particularly, the operation display unit 31 notifies the user about state information of a belt drive motor 32 illustrated in FIG. 2, state information of a photosensitive member drive motor 35 illustrated in FIG. 2, and state information of a driving system of driven components (driven units) that are driven by the drive motors 32 and 35.

The image forming unit 10 includes an intermediate transfer belt 11 that is an endless belt; includes image forming sections 20Y, 20M, 20C, and 20K that respectively form images of the yellow (Y) color, the magenta (M) color, the cyan (C) color, and the black (K) color; includes an optical writing unit 12; and includes a transfer roller 13. Herein, the image forming sections 20Y, 20M, 20C, and 20K; the optical writing unit 12; and the transfer roller 13 are disposed along the intermediate transfer belt 11. Moreover, the intermediate transfer belt 11 is wound around a driving roller 14, a driven roller 15, and a tension roller 16.

In the image forming unit 10, when the driving roller 14 is rotary-driven in the counterclockwise direction, which is illustrated by an arrow in FIG. 1, via the belt drive motor 32 and via a drive force transmission mechanism such as a gear (not illustrated); the intermediate transfer belt 11 is rotated in the counterclockwise direction.

In the image forming sections 20Y, 20M, 20C, and 20K are respectively disposed photosensitive members 21Y, 21M, 21C, and 21K. Moreover, the photosensitive members 21Y, 21M, 21C, and 21K are disposed at predetermined intervals from each other along the carrying direction of the intermediate transfer belt 11. Around the photosensitive members 21Y, 21M, 21C, and 21K are disposed developing units 22Y, 22M, 22C, and 22K, respectively; transfer rollers 23Y, 23M, 23C, and 23K, respectively; charging units (not illustrated); cleaning units (not illustrated); and discharging units (not illustrated).

In the image forming sections 20Y, 20M, 20C, and 20K, respectively; the photosensitive members 21Y, 21M, 21C, and 21K are rotary-driven in the clockwise direction with reference to FIG. 1 via the photosensitive member drive motor 35 and via a drive force transmission mechanism such as a gear (not illustrated). In the color mode, the photosensitive members 21Y, 21M, 21C, and 21K that are rotating are uniformly charged by the corresponding charging units and are then exposed to laser lights, which are modulated based on the image data of respective colors, at predetermined exposure positions. As a result, an electrostatic latent image gets formed on each of the photosensitive members 21Y, 21M, 21C, and 21K. In contrast, in the monochromatic mode, the image forming sections 20Y, 20M, 200, and 20K respectively expose the photosensitive members 21Y, 21M, 21C, and 21K, which are used for image forming colors (called relevant colors), to the laser lights that are modulated based on the image data of relevant colors by the optical writing unit 12. As a result, electrostatic latent images of the relevant colors are formed. For example, in the monochromatic mode, in the image forming sections 20Y, 20M, 20C, and 20K; the photosensitive member 21K used for black color is exposed to the laser light that is modulated based on monochromatic image data from the optical writing unit 12. As a result, a monochromatic electrostatic latent image is formed.

In the image forming sections 20Y, 20M, 20C, and 20K, respectively; after the electrostatic latent images on the photosensitive members 21Y, 21M, 21C, and 21K, the developing units 22Y, 22M, 22C, and 22K respectively attach toners (developers) of the yellow (Y) color, the magenta (M) color, the cyan (C) color, and the black (K) color on the photosensitive members 21Y, 21M, 21C, and 21K, respectively. As a result, toner images (developer images) of those colors are formed. In the image forming sections 20Y, 20M, 20C, and 20K, respectively; the rotations of the photosensitive members 21Y, 21M, 21C, and 21K result in carrying the toner images formed thereon to a contact position with the intermediate transfer belt 11. Then, a transfer voltage is applied to the transfer rollers 23Y, 23M, 23C, and 23K that are disposed in a sandwiched manner between the intermediate transfer belt 11 and the photosensitive members 21Y, 21M, 21C, and 21K, respectively. In the color mode, onto the intermediate transfer belt 11, the image forming sections 20Y, 20M, 20C, and 20K sequentially transfer in a superimposed manner the toner image of yellow (Y) color, the toner image of magenta (M) color, the toner image of cyan (C) color, and the toner image of black (K) color that are formed on the photosensitive members 21Y, 21M, 21C, and 21K, respectively. That results in the formation of a color toner image. In contrast, in the monochromatic mode, onto the intermediate transfer belt 11, the image forming sections 20Y, 20M, 20C, and 20K transfer the toner images of relevant colors formed on the photosensitive members 21Y, 21M, 21C, and 21K, respectively. That results in the formation of a monochromatic toner image.

After the toner images are transferred, in the image forming sections 20Y, 20M, 20C, and 20K; the respective cleaning units clean the residual toner from the photosensitive members 21Y, 21M, 21C, and 21K, respectively, and the respective discharging units discharge the photosensitive members 21Y, 21M, 21C, and 21K, respectively. Then, the respective charging units again charge the photosensitive members 21Y, 21M, 21C, and 21K to make them ready for the next image forming operation.

The intermediate transfer belt 11 is rotary-driven due to the rotations of the driving roller 14. As a result, the toner image that has been transferred onto the intermediate transfer belt 11 is carried to a transfer position between the intermediate transfer belt 11 and the transfer roller 13. Then, the transfer roller 13 applies a pressure and a transfer voltage to the paper sheet P that has been carried to the transfer position from the paper feeding unit. With that, the toner image formed on the intermediate transfer belt 11 gets transferred onto that paper sheet P.

Meanwhile, as illustrated in FIG. 2, the image forming apparatus 1 has a block configuration and includes the control unit 30, the operation display unit 31, a belt drive motor 32, a current detector 33, an encoder 34, the photosensitive member drive motor 35, a current detector 36, and an encoder 37. In addition, the image forming apparatus 1 also includes the optical writing unit 12, the driving roller 14, and the photosensitive members 21Y, 21M, 21C, and 21K.

The control unit 30 includes a central processing unit (CPU) 41, a read only memory (ROM) 42, a random access memory (RAM) 43, a nonvolatile random access memory (NVRAM) 44, an application specific integrated circuit (ASIC) 45, an input-output (I/O) 46, an external interface (I/F) 47, an optical writing drive control unit 48, a belt drive-motor driving unit 49, a photosensitive-member drive-motor driving unit 50.

The ROM 42 is used to store in advance the basic program of the image forming apparatus 1, a state determining program (described later), and the data required to execute those programs. The CPU 41 uses the RAM 43 as a work memory according to the computer programs stored in the ROM 42. Moreover, the CPU 41 controls the constituent elements of the image forming apparatus 1, executes the basic sequence of the image forming apparatus 1, and implements a state determining method (described later).

The image forming apparatus 1 reads the state determining program, which is executed to implement the state determining method according to the present invention, from a computer-readable recording medium such as a read only memory (ROM), an electrically erasable and programmable read only memory (EEPROM), an erasable and programmable read only memory (EPROM), a flash memory, a compact disk read only memory (CD-ROM), a compact disk rewritable (CD-RW), a digital versatile disk (DVD) a secure digital (SD) card, or a magneto-optical (MO) disk. Then, the image forming apparatus 1 loads the state determining program into the ROM 42. As a result, the image forming apparatus 1 is built as an image processing apparatus that is equipped with a state determining device for implementing a state determining method in order to determine the state of a driving system of driven components (described later) and the drive motors 32 and 35 (described later). The state determining program is a computer-executable program that is written in a legacy programming language such as an assembler or C, or is written in an object-oriented programming language such as C++, C#, or Java (registered trademark). The state determining program can be distributed by storing it in the abovementioned recording medium.

The NVRAM 44 is a nonvolatile memory in which the stored contents are held even after the power supply of the image forming apparatus 1 is turned off. In the NVRAM 44 is stored the data that is needed to be held even after the power supply of the image forming apparatus 1 is turned off. For example, under the control of the CPU 41, the following data is stored in the NVRAM 44: details of mode instructions issued from the operation display unit 31; initial setting values of print conditions; normal setting commands; and setting values of print conditions that are set by performing setting operations in the operation display unit 31 and that need to be kept as backup (particularly, various threshold values that are used during a state determining operation (described later). Meanwhile, alternatively, the threshold values used during the state determining operation can be stored in the ROM 42.

The ASIC 45 makes use of the RAM 43 and performs a variety of image processing that needs to be performed in the image forming apparatus 1.

The optical writing drive control unit 48 controls the driving of the optical writing unit 12 based on the image data processed by the ASIC 45 and based on control signals; and makes the optical writing unit 12 emit laser lights, each of which is modulated according to the image data of a particular color, to the photosensitive members 21Y, 21M, 21C, and 21K.

Under the control of the CPU 41, the belt drive-motor driving unit 49 controls the driving of the belt drive motor 32 by controlling the drive current flowing into the belt drive motor 32, as well as controls the movement of the intermediate transfer belt 11 by controlling the rotation of the driving roller 14. Thus, the driving roller 14; the intermediate transfer belt 11; and the driven roller 15 and the tension roller 16, which rotate along with the rotation of the intermediate transfer belt 11, are driven as driven components (driven units) by the belt drive motor 32.

The current detector (a current detecting unit) 33 detects the current value of the drive current flowing into the belt drive motor 32, and outputs the detected current value to the CPU 41 via the I/O 46. The encoder 34 detects the rotation of the belt drive motor 32 and outputs the detection result to the CPU 41 via the I/O 46.

Under the control of the CPU 41, the photosensitive-member drive-motor driving unit 50 controls the driving of the photosensitive member drive motor 35 by controlling the drive current flowing into the photosensitive member drive motor 35; and accordingly controls the rotation of the photosensitive members 21Y, 21M, 21C, and 21K. Thus, the photosensitive members 21Y, 21M, 21C, and 21K and the developing units 22Y, 22M, 22C, and 22K are driven as driven components (driven units) by the photosensitive member drive motor 35.

The current detector (a current detecting unit) 36 detects the current value of the drive current flowing into the photosensitive member drive motor 35, and outputs the detected current value to the CPU 41 via the I/O 46. The encoder 37 detects the rotation of the photosensitive member drive motor 35 and outputs the detection result to the CPU 41 via the I/O 46.

Based on the current values of the drive currents (i.e., based on the drive current values) detected by the current detectors 33 and 36, the CPU 41 functions as a state determining unit for determining the state (a deterioration state or a malfunctioning state) of the driven components, the belt drive motor 32, the photosensitive member drive motor 35, and the driving system such as the drive force transmission mechanism including the drive motors 32 and 35 and the driven components.

To the external I/F 47 is connected a host device such as a personal computer (not illustrated) that sends print data (image data) to the image forming apparatus 1 and instructs the image forming apparatus 1 to perform printing (image formation). Thus, the image forming apparatus 1 performs a printing operation based on the image data received from the host device.

That is, the CPU 41, the current detectors 33 and 36, and the operation display unit 31 of the control unit 30 collectively function as a state determining device (a state determining unit) that, based on drive current values, determines the state of the driving system including the belt drive motor 32, the photosensitive member drive motor 35, and the driven components. With that, the image forming apparatus 1 becomes equipped with a state determining device.

Given below is the explanation of the operations performed according to the embodiment. The image forming apparatus 1 according to the embodiment refers to the drive current values flowing into the drive motors 32 and 35, and accordingly determines and outputs a notification about the state of the driven components driven by the drive motors 32 and 35 as well as the state of the driving system including the drive motors 32 and 35 and the drive force transmission mechanism.

In the image forming apparatus 1, at the time of image formation, under the control of the CPU 41, the belt drive-motor driving unit 49 controls the drive current value flowing into the belt drive motor 32 so that the belt drive motor 32 rotates at a predetermined rotation speed. Then, the belt drive motor 32 rotary-drives the driving roller 14 and in turn rotary-drives the intermediate transfer belt 11. Moreover, in the image forming apparatus 1, under the control of the CPU 41, the photosensitive-member drive-motor driving unit 50 controls the drive current value flowing into the photosensitive member drive motor 35 so that the photosensitive member drive motor 35 rotates at a predetermined rotation speed. In the image forming apparatus 1, the photosensitive member drive motor 35 rotates the photosensitive members 21Y, 21M, 21C, and 21K at a constant speed. Then, toner images are formed on the photosensitive members 21Y, 21M, 21C, and 21K that are rotating, and the toner images are transferred onto the intermediate transfer belt 11.

Figure 3:
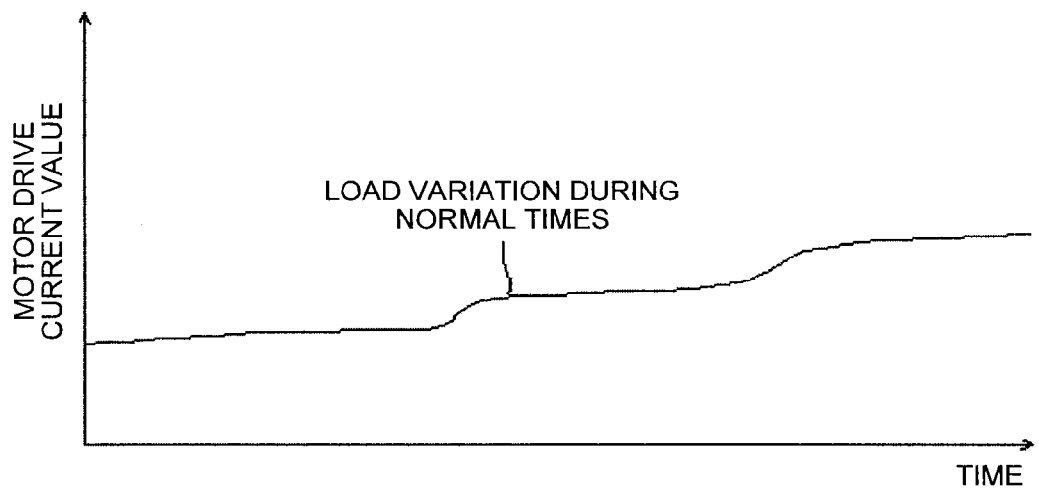
FIG. 3 is a diagram illustrating an example of temporal changes in drive current values of drive motors during normal times.

Then, in order to rotary-drive the belt drive motor 32 and the photosensitive member drive motor 35 at respective intended speeds, the image forming apparatus 1 makes use of the encoders 34 and 37 to detect the rotation speeds of the drive motors 32 and 35. Accordingly, the belt drive-motor driving unit 49 controls the drive current value flowing into the belt drive motor 32, and the photosensitive-member drive-motor driving unit 50 controls the drive current value flowing into the photosensitive member drive motor 35. That is, in the case of rotary-driving the belt drive motor 32 and the photosensitive member drive motor 35 at respective intended speeds based on the detection results of the encoders 34 and 37; the drive current values flowing into the belt drive motor 32 and the photosensitive member drive motor 35 change, for example, as illustrated in FIG. 3 according to the deterioration state of the load that is driven by the belt drive motor 32 and the photosensitive member drive motor 35. Herein, the load indicates the belt-related driven components such as the driving roller 14 and the intermediate transfer belt 11 as well as indicates the photosensitive-member-related driven components such as the photosensitive members 21Y, 21M, 21C, and 21K.

Thus, regarding the belt drive motor 32 that drives the driving roller 14, the intermediate transfer belt 11, and the driven roller 15 and the tension roller 16 that rotate along with the rotation of the intermediate transfer belt 11 as belt-related driven components (driven units), and regarding the photosensitive member drive motor 35 that drives the photosensitive members 21Y, 21M, 21C, and 21K and the developing units 22Y, 22M, 22C, and 22K as photosensitive-member-related driven components (driven units); generally, due to the deterioration of the belt-related driven components and the photosensitive-member-related driven components (hereinafter, appropriately and simply referred to as "driven components"), the drive current values of the drive motors 32 and 35 change, for example, as illustrated in FIG. 3. That is, due to an increase in the load accompanying the temporal changes in the driven components and the temporal changes in the drive motors 32 and 35, the drive current values flowing into the drive motors 32 and 35 tend to increase as illustrated in FIG. 3. The general factors contributing to the increase in the load include deterioration of the integrated components inside the driven components or deterioration due to wear of the drive transmission components such as gears that transmit the drive force from the drive motors 32 and 35 to the respective driven components.

Figure 4:
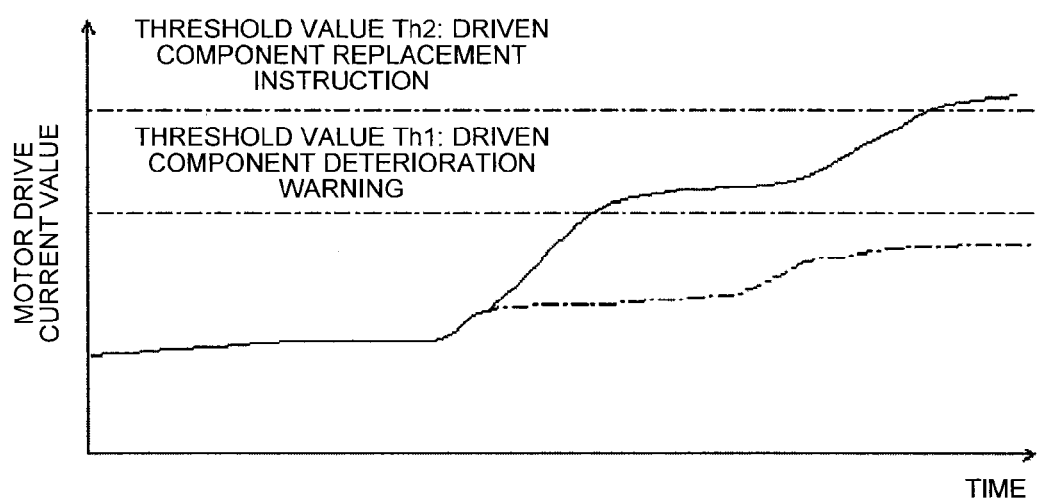
FIG. 4 is a diagram illustrating the relationship between drive current values, a warning about component deterioration, and a replacement instruction.
Figure 5:
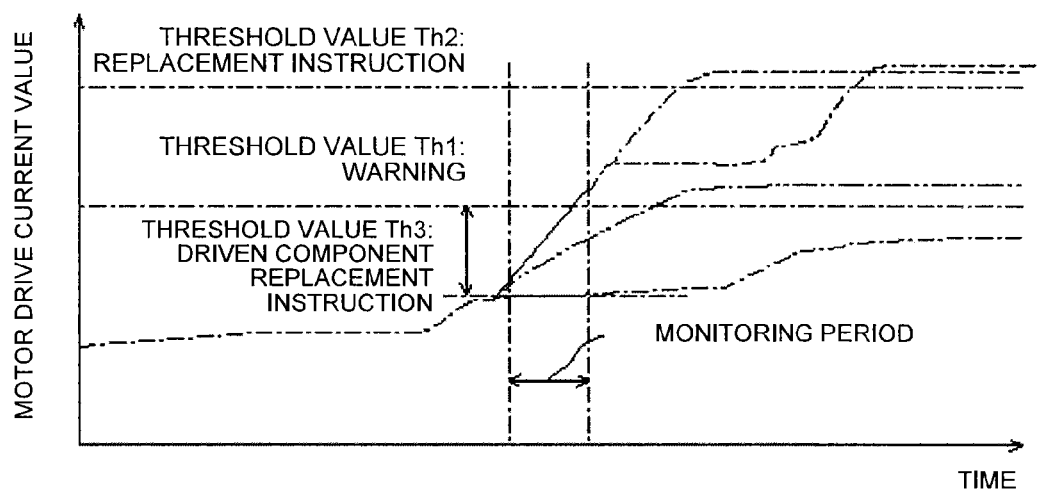
FIG. 5 is a diagram illustrating the relationship between the amount of variation of drive current values within a monitoring period and a component replacement instruction.

However, if the deterioration of the driven components has progressed and leads to a malfunctioning state, then the drive current values change substantially as illustrated, for example, by a solid line in FIG. 4. Meanwhile, in FIG. 4, a dashed-dotted line represents the drive current values corresponding to the normal deterioration illustrated in FIG. 3.

In that regard, in the image forming apparatus 1 according to the embodiment, the deterioration state or the malfunctioning state of the driven components is determined based on the drive current values that are detected by the current detectors 33 and 36 and that flow into the belt drive motor 32 and the photosensitive member drive motor 35, respectively. Then, the state information is notified by displaying it on a display of the operation display unit 31.

In the ROM 42 or the NVRAM 44 of the image forming apparatus 1 are stored, for example, two threshold values Th1 and Th2 as illustrated in FIG. 4 that are used for the purpose of determining in advance the state of the driven components. The threshold value Th1 is used in determining the deterioration state of the driven components regarding which a warning needs to be output. The threshold value Th2 is used in determining the deterioration state of the driven components regarding which a replacement instruction needs to be output. Meanwhile, regarding the threshold value Th1 and the threshold value Th2, the relationship of Th1<Th2 is satisfied as illustrated in FIG. 4.

During the image forming operation, as described above, based on the detection result of the encoders 34 and 37, the CPU 41 rotary-drives the belt drive motor 32 and the photosensitive member drive motor 35, respectively, via the belt drive-motor driving unit 49 and the photosensitive-member drive-motor driving unit 50, respectively. Moreover, the CPU 41 makes use of the current detectors 33 and 36 to detect the drive currents flowing into the belt drive motor 32 and the photosensitive member drive motor 35, respectively. Then, as illustrated in FIG. 4, the CPU 41 compares the detected drive current values with the thresholds Th1 and Th2. If the detected drive current values are smaller than the threshold value Th1, then the CPU 41 determines that the deterioration has not progressed and then continues with the image forming operation.

However, if the detected drive current values exceed the threshold value Th1 but are smaller than the threshold value Th2; then the CPU 41 determines that, although the deterioration of the driven components has progressed, the deterioration state still allows continuing with the image formation. In that case, the CPU 41 continues with the image forming operation and issues a warning by displaying, on the display of the operation display unit 31, warning information (state information) about the fact that there is deterioration of the driven components (the belt-related driven components and the photosensitive-member-related driven components) of the drive motors 32 and 35 that have the drive current values exceeding the threshold value Th1. Meanwhile, the CPU 41 can function as a warning issuing unit for issuing a warning that is viewable only by the servicemen.

When the detected drive current values exceed the threshold value Th2, the CPU 41 determines that the driven components have deteriorated to such an extent that they need to be replaced. In that case, the CPU 41 continues with the image forming operation but issues a driven component replacement instruction by displaying, on the display of the operation display unit 31, replacement instruction information (state information) about the fact that replacement is necessary for the driven components (the belt-related driven components and the photosensitive-member-related driven components) of the drive motors 32 and 35 that have the drive current values exceeding the threshold value Th2.

In this way, by outputting the state information indicating that replacement is necessary, it becomes possible to prompt replacement of the driven components as well as to avoid a situation in which an image forming operation abruptly stops due to deterioration of the driven components.

Meanwhile, as far as the state determination performed by the image forming apparatus 1 based on the drive current values is concerned, in addition to the determination of the deterioration state of the driven components based on the threshold values Th1 and Th2, it is also possible to determine a malfunctioning state in which the driven components malfunction in a drastic manner due to, for example, the entry of foreign material or partial breakage.

In that case, in the ROM 42 or the NVRAM 44 of the image forming apparatus 1 is stored, for example, a threshold value (a variation amount threshold value) Th3 with respect to the amount of variation in the drive current values within a predetermined monitoring period (a predetermined period of time). During the monitoring period, the CPU 41 calculates the amount of variation in the drive current values detected by the current detectors 33 and 36. Then, the CPU 41 compares the amount of variation in the drive current values with the threshold value Th3. As illustrated by a solid line in FIG. 5, if the amount of variation in the drive current values during the monitoring period exceeds the threshold value Th3 (i.e., exceeds the amount of variation illustrated in a double-headed arrow in FIG. 5), then the CPU 41 determines that a malfunctioning state has occurred drastically and that the driven components need to be replaced. For example, the CPU 41 issues a driven component replacement instruction by displaying replacement instruction information (malfunctioning state notification) about the fact that replacement is necessary for the driven components (the belt-related driven components and the photosensitive-member-related driven components) of the drive motors 32 and 35 for which the amount of variation in the drive current values has exceeded the threshold value Th3. Meanwhile, as long as the monitoring period enables proper determination of malfunctioning of the components, it can be set to an appropriate period. For example, a period of one minute can be set as the monitoring period. Then, for example, in hourly monitoring cycles, the CPU 41 performs a component malfunctioning determining operation based on the amount of variation in the drive current values during that monitoring period.

In this way, by issuing a warning that replacement is necessary due to drastic malfunctioning, it becomes possible to prompt replacement of the driven components as well as to avoid a situation in which an image forming operation abruptly stops due to malfunctioning of the driven components or a situation in which there occurs deterioration or malfunctioning of the other components (such as the drive motors 32 and 35 and the transmission system thereof).

Figure 6:
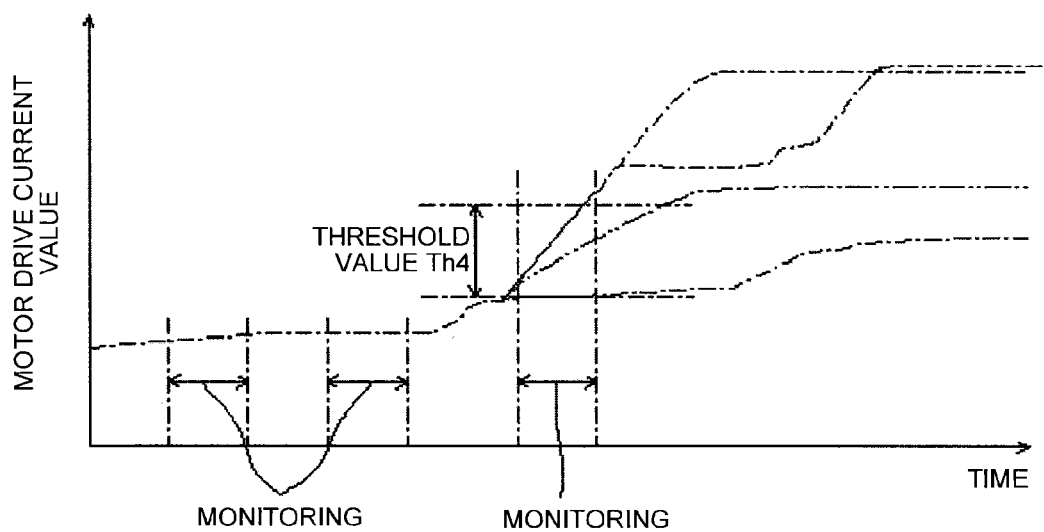
FIG. 6 is a diagram illustrating the relationship between the variation range of drive current values within each monitoring period and a component replacement instruction.

Meanwhile, consider the case of determining the presence or absence of malfunctioning of the driven components based on the amount of variation in the drive current values. In that case, as illustrated in FIG. 6, a threshold value Th4 with respect to the variation range of the amount of variation in the drive current values during each monitoring period can be stored in the ROM 42 or the NVRAM 44 of the image forming apparatus 1; and the state of the driven components can be determined based on the variation range of the amount of variation.

In this way, during each monitoring period, the CPU 41 calculates the amount of variation in the drive current values detected by the current detectors 33 and 36; and sequentially stores the amounts of variation in the RAM 43 or the NVRAM 44. Then, the CPU 41 calculates the variation range between the amount of variation in the drive current values during the previous monitoring period and the amount of variation in the drive current values during the current monitoring period, and compares the variation range with the threshold value Th4. If the amount of variation in the drive current values during a monitoring period exceeds the threshold value Th4, then the CPU 41 determines that a component malfunction state has occurred drastically. For example, the CPU 41 issues a warning by displaying warning information about the fact that replacement is necessary due to drastic malfunctioning of the driven components (the belt-related driven components and the photosensitive-member-related driven components) of the drive motors 32 and 35 for which the variation range of the amount of variation in the drive current values during a monitoring period exceeds the threshold value Th4. In this case too, the monitoring period can be determined in an identical manner to that described above. Moreover, the intervals between to two monitoring periods can also be set to an appropriate interval (such as one hour).

With that, it becomes possible to determine malfunctioning of the driven components in a more proper manner. Moreover, by issuing a warning that replacement is necessary due to drastic malfunctioning, it becomes possible to prompt replacement of the driven components as well as to avoid a situation in which an image forming operation abruptly stops due to malfunctioning of the driven components or a situation in which there secondarily occurs deterioration or malfunctioning of the other components (such as the drive motors 32 and 35 and the transmission system thereof).

Meanwhile, based on the drive current values of the drive motors 32 and 35, the image forming apparatus 1 can detect malfunctioning of the drive motors 32 and 35 and malfunctioning of the drive force transmission mechanism including the drive motors 32 and 35 and the driven components. Regarding the drive force transmission mechanism, the replacement is generally done in an integrated manner with the drive motors 32 and 35.

Figure 7:
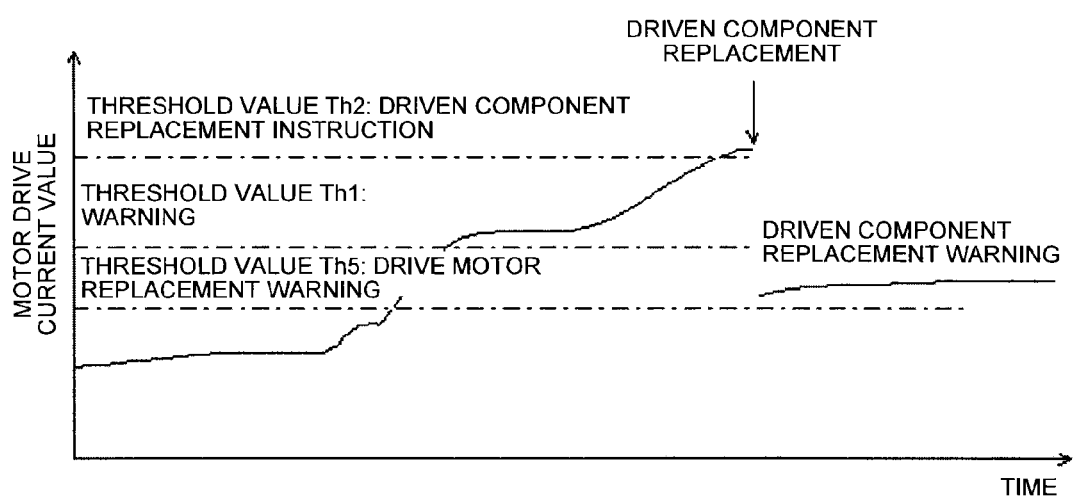
FIG. 7 is a diagram illustrating the relationship between drive current values and a drive motor replacement warning.

In this case, in the ROM 42 or the NVRAM 44 of the image forming apparatus 1 is stored a threshold value Th5, illustrated in FIG. 7, of drive current values with respect to a replacement warning for the drive motors 32 and 35 within a predetermined period of time since the replacement of the driven components. Then, based on a user operation of the operation display unit (a replacement detecting unit) 31 or based on a signal received from a sensor (a replacement detecting unit) that detects replacement of components, the CPU 41 detects that the belt-related driven components and the photosensitive-member-related driven components have been replaced with new components. Then, prior to the elapse of a predetermined period of time since the replacement of components, the CPU 41 compares the drive current values detected by the current detectors 33 and 36 with the threshold value Th5 that is stored in the ROM 42 or the NVRAM 44. If the drive current values are exceeding the threshold value Th5, then the CPU 41 determines that malfunctioning has occurred in the drive motors 32 and 35 that drive the driven components which have been replaced. Hence, the CPU 41 issues a warning by displaying, on the display of the operation display unit 31, warning information about the fact that the drive motors 32 and 35 are in a malfunctioning state and need to be replaced.

With that, it becomes possible to properly determine the malfunctioning of the drive motors 32 and 35 or the malfunctioning of the drive force transmission mechanism. Moreover, it becomes possible to prompt replacement of the drive motors 32 and 35 as well as to avoid a situation in which an image forming operation abruptly stops due to malfunctioning of the drive motors 32 and 35.

Figure 8:
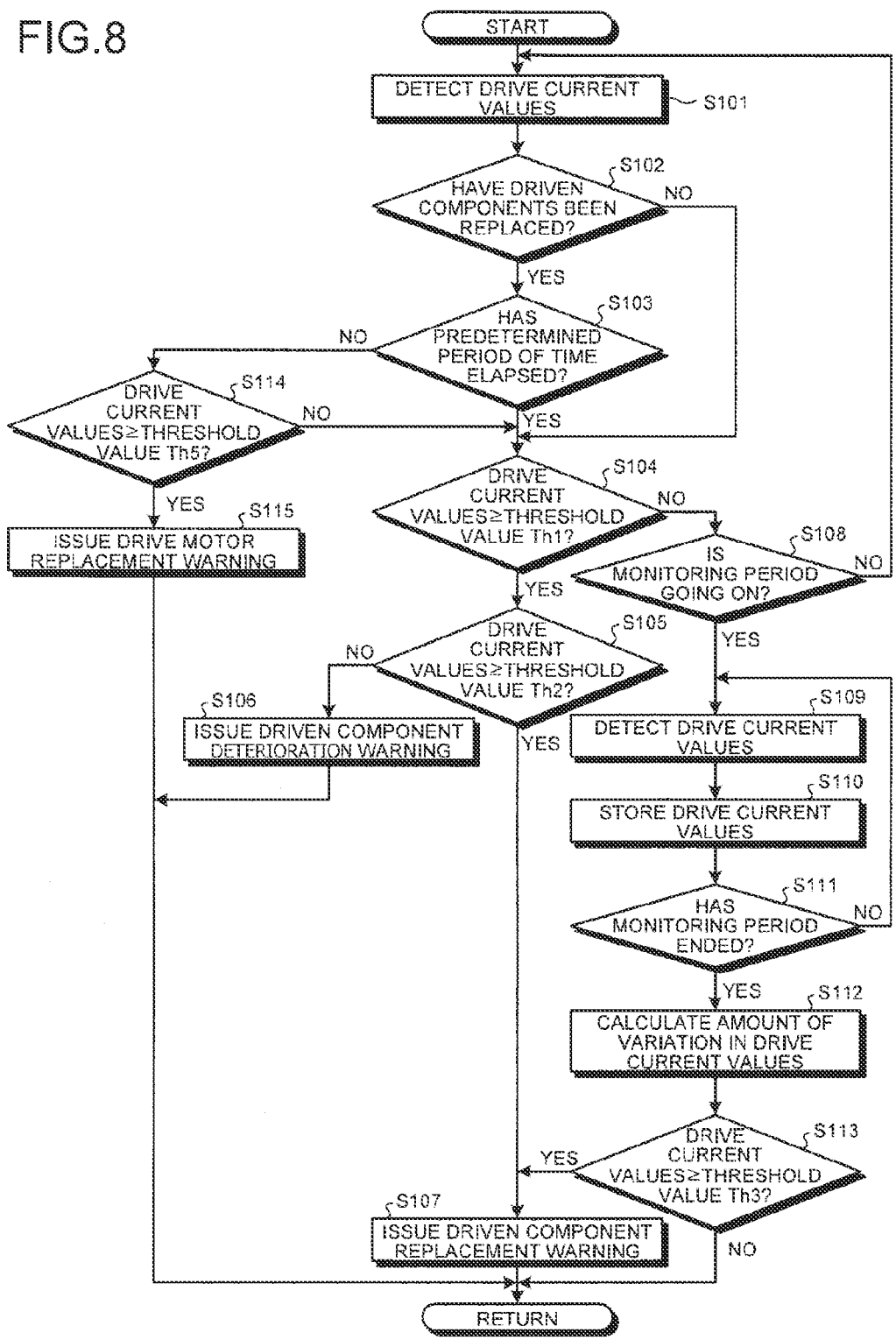
FIG. 8 is a flowchart for explaining a state determining operation.

Thus, as illustrated in FIG. 8, the CPU 41 obtains the drive current values (Step S101) and checks whether the driven components have been replaced (Step S102). If the driven components have been replaced (Yes at Step S102), then the CPU 41 checks whether a predetermined period of time has elapsed (Step S103). If the predetermined period of time has elapsed (Yes at Step S103), then the CPU 41 checks whether the drive current values are equal to or greater than the threshold value Th1 (Step S104).

If the drive current values are equal to or greater than the threshold value Th1 (Yes at Step S104), then the CPU 41 checks whether the drive current values are equal to or greater than the threshold value Th2 that is greater than the threshold value Th1 (Step S105). If the drive current values are smaller than the threshold value Th2 (No at Step S105); then the CPU 41 determines that, although the deterioration of the driven components has progressed, the deterioration state still allows continuing with the image formation. In that case, the CPU 41 continues with the image forming operation and issues a warning by displaying, on the display of the operation display unit 31, warning information about the fact that there is deterioration of the driven components (the belt-related driven components and the photosensitive-member-related driven components) of the drive motors 32 and 35 that have the drive current values exceeding the threshold value Th1 (Step S106). Then, the system control returns to Step S101, and the operations from Step S101 to Step S106 are repeated.

Meanwhile, if the drive current values are equal to or greater than the threshold value Th2 (Yes at Step S105); then the CPU 41 determines that the driven components have deteriorated to such an extent that they need to be replaced. In that case, the CPU 41 continues with the image forming operation but issues a driven component replacement instruction by displaying, on the display of the operation display unit 31, replacement instruction information about the fact that replacement is necessary for the driven components (the belt-related driven components and the photosensitive-member-related driven components) of the drive motors 32 and 35 that have the drive current values exceeding the threshold value Th2 (Step S107). Then, the system control returns to Step S101, and the operations from Step S101 to Step S107 are repeated.

Meanwhile, if the drive current values are smaller than the threshold value Th1 (No at Step S104), then the CPU 41 checks whether the monitoring period is still going on (Step S108). If the monitoring period is not going on (No at Step S108), then the system control returns to Step S101, and the operations from Step S101 to Step S108 are repeated.

On the other hand, if the monitoring period is still going on (Yes at Step S108); then the CPU 41 obtains the drive current values (Step S109), stores those drive current values in the RAM 43 or the NVRAM 44 (Step S110), and checks whether the monitoring period has ended (Step S111).

If the monitoring period has not yet ended (No at Step S111), then the system control returns to Step S109, and the operations from Step S109 (obtaining the drive current values detected by the current detectors 33 and 36) to Step S111 are repeated. On the other hand, if the monitoring period has ended (Yes at Step S111), then the CPU 41 calculates the amount of variation in the drive current values within that monitoring period (Step S112) and checks whether the amount of variation in the drive current values is equal to or greater than the threshold value Th3 (Step S113).

If the amount of variation in the drive current values is smaller than the threshold value Th3 (No at Step S113), then the CPU 41 determines that there is only a small deterioration of the driven components and no drastic malfunctioning has occurred. Hence, the CPU 41 does not issue any warning. Then, the system control returns to Step S101, and the operations from Step S101 to Step S113 are repeated.

On the other hand, if the amount of variation in the drive current values is equal to or greater than the threshold value Th3 (Yes at Step S113), then the CPU 41 determines that a component malfunction state has occurred drastically and, for example, issues a driven component replacement instruction by displaying, on the display of the operation display unit 31, replacement instruction information about the fact that replacement is necessary due to drastic malfunctioning of the driven components (the belt-related driven components and the photosensitive-member-related driven components) of the drive motors 32 and 35 that have the drive current values equal to or greater than the threshold value Th3 (Step S107).

Then, the system control returns to Step S101, and the operations from Step S101 to Step S113 are repeated.

Then, if a predetermined period of time has not elapsed since the replacement of the driven components (No at Step S103), then the CPU 41 checks whether the drive current values are equal to or greater than the threshold value Th5 (Step S114). If the drive current values are smaller than the threshold value Th5 (No at Step S114), then the CPU 41 determines that the drive motors 32 and 35 are not malfunctioning and there is no progress in deterioration. Then, the system control proceeds to Step S104, and the operations from Step S104 to Step S114 are repeated.

On the other hand, if the drive current values are equal to or greater than the threshold value Th5 (Yes at Step S114); then the CPU 41 determines that malfunctioning has occurred in the drive motors 32 and 35 that drive the driven components which have been replaced or determines that malfunctioning has occurred in the drive force transmission mechanism, and issues a warning by displaying, on the display of the operation display unit 31, warning information about the fact that the drive motors 32 and 35 need to be replaced (Step S115). Then, the system control returns to Step S101, and the operations from Step S101 to Step S115 are repeated.

In the embodiment described above, the explanation is given for a case in which the image forming apparatus 1 is equipped with a state determining device. Alternatively, the status determining device can also be implemented in general in an image processing apparatus in which a drive motor such as a scanner drives the driven components that are required during image processing.

In this way, the image forming apparatus 1 according to the embodiment includes the current detectors (current detecting units) 33 and 36 that detect the current values of the drive currents flowing respectively into the drive motors 32 and 35, which rotary-drive the driven components (driven units) with a drive force according to the respective drive currents; includes the CPU (a state determining unit) 41 that determines the state of the driving system of the driven components based on the drive current values detected by the current detectors 33 and 36; and includes the operation display unit (a notifying unit) 31 that notifies a user of the determination result of the CPU 41.

With that, the state of the driving system of the driven components can be determined based on the drive current values flowing into the drive motors 32 and 35. Hence, it becomes possible to accurately and inexpensively determine the state of the driving system of the driven components that are driven by the drive motors 32 and 35.

Moreover, the image forming apparatus 1 according the embodiment implements a state determining method that includes: detecting the current values of the drive currents flowing into the drive motors 32 and 35 which rotary-drive the driven components according to the respective current values; determining the state of the driving system of the driven components based on the drive current values detected at the detecting; and outputting a notification of the determination result obtained at the determining.

With that, the state of the driving system of the driven components can be determined based on the drive current values flowing into the drive motors 32 and 35. Hence, it becomes possible to accurately and inexpensively determine the state of the driving system of the driven components that are driven by the drive motors 32 and 35.

Furthermore, the image forming apparatus 1 according to the embodiment is installed with a state determining program that causes the image forming apparatus 1 to execute: detecting the current values of the drive currents flowing into the drive motors 32 and 35 which rotary-drive the driven components according to the respective current values; determining for determining the state of the driving system of the driven components based on the drive current values detected during the detecting; and outputting a notification of the determination result obtained during the determining.

With that, the state of the driving system of the driven components can be determined based on the drive current values flowing into the drive motors 32 and 35. Hence, it becomes possible to accurately and inexpensively determine the state of the driving system of the driven components that are driven by the drive motors 32 and 35.

Moreover, in the image forming apparatus 1 according to the embodiment, if the drive current values detected by the current detectors 33 and 36 are exceeding the threshold value Th1 that is a predetermined current threshold value, then the CPU 41 determines that the driven components have deteriorated and instructs the operation display unit 31 to issue a warning about deterioration of the driven components.

With that, it becomes possible to notify the fact that the driven components have been deteriorating. Hence, it becomes possible to make the user realize about the deterioration state of the driven components. That enables achieving enhancement in the usability of the image forming apparatus 1.

Furthermore, in the image forming apparatus 1 according to the embodiment, the CPU 41 determines the state of the driven components based on the amount of variation in the drive current values detected during a predetermined period of time by the current detectors 33 and 36.

With that, it becomes possible to detect the occurrence of a drastic malfunctioning state and to prompt the user take proper measures. That enables achieving enhancement in the usability of the image forming apparatus 1.

Moreover, in the image forming apparatus 1 according to the embodiment, if the amount of variation in the drive current values exceeds the threshold value Th3 that is a predetermined variation amount threshold value, then the CPU 41 determines that the driven components are in a predetermined malfunctioning state and instructs the operation display unit 31 to output a malfunctioning notification about the fact that the driven components are in a malfunctioning state.

Thus, by issuing a warning that, for example, the driven components have deteriorated to such an extent that they need to be replaced; the user can be prompted to take measures such as replacing the driven components. Hence, it becomes possible to avoid a situation in which an image forming operation abruptly stops due to malfunctioning of the driven components or a situation in which there occurs deterioration or malfunctioning of the other components (such as the drive motors 32 and 35 and the transmission system thereof).

Meanwhile, the image forming apparatus 1 according to the embodiment includes memory units such as the RAM 43 and the NVRAM 44 that are used to store the amounts of variation in the drive current values. The CPU 41 sequentially stores the amounts of variation in the drive current values in the memory unit. Then, if the variation range between the present amount of variation in the drive current values and the previous amount of variation in the drive current values exceeds the threshold value Th4 that is a predetermined variation range threshold value, then the CPU 41 determines that the driven components are in a predetermined malfunctioning state and instructs the operation display unit 31 to output a malfunctioning notification about the fact that the driven components are in a malfunctioning state.

With that, malfunctioning of the driven components can be determined in a more proper manner. Moreover, by issuing a warning that the driven components need to be replaced due to drastic malfunctioning, the user can be prompted to replace the driven components. Hence, it becomes possible to avoid a situation in which an image forming operation abruptly stops due to malfunctioning of the driven components or a situation in which there secondarily occurs deterioration or malfunctioning of the other components (such as the drive motors 32 and 35 and the transmission system thereof).

Moreover, the image forming apparatus 1 according to the embodiment also includes a replacement detecting unit such as a sensor or the operation display unit 31 that detects replacement of the driven components. During a predetermined period of time after the replacement detecting unit has detected replacement of the driven components, if the drive current values detected by the current detectors 33 and 36 exceed the threshold value Th5 that is a predetermined motor threshold value, then the CPU 41 determines that the drive motors 32 and 35 are in a predetermined malfunctioning state and instructs the operation display unit 31 to output a malfunctioning notification about the fact that the drive motors 32 and 35 are in a malfunctioning state.

With that, malfunctioning of the drive motors 32 and 35 can be properly determined, and the user can be prompted to replace the drive motors 32 and 35. As a result, it becomes possible to avoid a situation in which an image forming operation abruptly stops due to malfunctioning of the drive motors 32 and 35.

Thus, according to an aspect of the present invention, it becomes possible to accurately and inexpensively determine the state of a driving system of driven components that are driven by drive motors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A state determining device comprising:
   a current detecting unit that detects a current value of a drive current which flows into a drive motor that rotary-drives a driven unit with a drive force according to the drive current;
   a state determining unit that, based on the drive current value detected by the current detecting unit, determines a state of a driving system including the driven unit;
   a notifying unit that notifies a user of a determination result of the state determining unit; and
   a replacement detecting unit that detects replacement of the driven unit,
   wherein during a predetermined period of time after the replacement detecting unit has detected replacement of the driven unit, if the drive current value detected by the current detecting unit exceeds a predetermined motor threshold value, then the state determining unit determines that the drive motor is in a predetermined malfunctioning state and instructs the notifying unit to output a malfunctioning notification that the drive motor is in a malfunctioning state.

2. The state determining device according to claim 1, wherein, when the drive current value detected by the current detecting unit exceeds a predetermined current threshold value, the state determining unit determines that the driven unit has deteriorated and instructs the notifying unit to issue a warning about deterioration of the driven unit.

3. The state determining device according to claim 1, wherein the state determining unit determines the state of the driven unit based on an amount of variation in the drive current value detected during a predetermined period of time by the current detecting unit.

4. The state determining device according to claim 3, wherein, when the amount of variation in the drive current value exceeds a variation amount threshold value, the state determining unit determines that the driven unit is in a predetermined malfunctioning state and instructs the notifying unit to output a malfunctioning notification that the driven unit is in a malfunctioning state.

5. The state determining device according to claim 3, further comprising a memory unit for storing amounts of variation in the drive current value, wherein the state determining unit sequentially stores the amounts of variation in the drive current value in the memory unit, and when a variation range between a present amount of variation in the drive current value and a previous amount of variation in the drive current value exceeds a predetermined variation range threshold value, the state determining unit determines that the driven unit is in a predetermined malfunctioning state and instructs the notifying unit to output a malfunctioning notification that the driven unit is in a malfunctioning state.

6. An image processing apparatus performing image processing by making use of a drive motor rotary-drives a driven unit with a drive force according to a drive current, and comprising a state determining unit that determines the state of a driving system including the driven unit, wherein the state determining unit is the state determining device according to claim 1.

7. A state determining method comprising:

detecting a current value of a drive current which flows into a drive motor that rotary-drives a driven unit with a drive force according to the drive current;

determining, based on the drive current value detected at the detecting, a state of a driving system including the driven unit;

notifying a user of a determination result obtained at the determining; and detecting replacement of the driven unit, wherein during a predetermined period of time after replacement of the driven unit has been detected, if the drive current value which has been detected exceeds a predetermined motor threshold value, then the determining of the state of the driving system determines that the drive motor is in a predetermined malfunctioning state and instructs the notifying to output a malfunctioning indicating the drive motor is in a malfunctioning state.

8. A computer program product comprising a non-transitory computer-readable medium containing a state determining program that causes a computer to execute:

detecting a current value of a drive current which flows into a drive motor that rotary-drives a driven unit with a drive force according to the drive current;

determining, based on the drive current value detected at the detecting, a state of a driving system including the driven unit;

notifying a user of a determination result obtained at the determining; and detecting replacement of the driven unit, wherein during a predetermined period of time after replacement of the driven unit has been detected, if the drive current value which has been detected exceeds a predetermined motor threshold value, then the determining of the state of the driving system determines that the drive motor is in a predetermined malfunctioning state and instructs the notifying to output a malfunctioning indicating the drive motor is in a malfunctioning state.

* * * * *